US007121311B2

(12) United States Patent
VanderSyde et al.

(10) Patent No.: US 7,121,311 B2
(45) Date of Patent: Oct. 17, 2006

(54) LINERLESS LABEL APPLICATION ASSEMBLY

(75) Inventors: Gary L. VanderSyde, Naperville, IL (US); Roy Charles Schoon, Glenview, IL (US); Jospeh Mitchell, Gurnee, IL (US)

(73) Assignee: Bowe Bell + Howell Postal Systems Company, Lincolnwood, IL (US)

( * ) Notice: Subject to any disclaimer, the term of this patent is extended or adjusted under 35 U.S.C. 154(b) by 0 days.

(21) Appl. No.: 10/745,157

(22) Filed: Dec. 23, 2003

(65) Prior Publication Data

US 2004/0244913 A1 Dec. 9, 2004

Related U.S. Application Data

(60) Provisional application No. 60/461,992, filed on Apr. 11, 2003.

(51) Int. Cl.
*B32B 38/14* (2006.01)
*B32B 39/00* (2006.01)
*B65C 9/00* (2006.01)

(52) U.S. Cl. ........................................ 156/387; 156/510

(58) Field of Classification Search ........ 156/384–387, 156/510, 511, 516, 517, 556
See application file for complete search history.

(56) References Cited

U.S. PATENT DOCUMENTS 2,552,312 A * 5/1951 Frank .......................... 83/607
2,866,503 A 12/1958 Townsend et al.
3,435,717 A 4/1969 Macomber
3,867,861 A * 2/1975 Hamisch, Sr. ............... 83/571
3,996,855 A * 12/1976 Pabodie ........................ 83/653
4,825,741 A * 5/1989 Wellington et al. ........... 83/748
5,229,587 A * 7/1993 Kimura et al. ....... 156/DIG. 48
5,776,297 A 7/1998 Edwards et al.
5,783,032 A 7/1998 O'Callaghan et al.
5,804,023 A 9/1998 Carpenter et al.
5,922,169 A * 7/1999 Chodacki et al. ........... 156/521
6,155,732 A 12/2000 Plasschaert et al.
6,182,730 B1 2/2001 Muir
6,387,203 B1 5/2002 Boreali et al.
6,655,251 B1 * 12/2003 Guidetti ........................ 83/602
6,880,440 B1 * 4/2005 Gass et al. .................... 83/62.1

FOREIGN PATENT DOCUMENTS

EP 1 466 830 10/2004
EP 1 466 830 A1 10/2004
WO WO 03/08673 10/2003
WO WO 03/086873 A1 10/2003

* cited by examiner

*Primary Examiner*—Chris Fiorilla
*Assistant Examiner*—Sing P. Chan
(74) *Attorney, Agent, or Firm*—McDermott Will & Emery LLP

(57) ABSTRACT

A label applicator for cutting labels to be applied to objects such as newspapers, letters, or flat mailpieces. The label applicator includes a movable blade and a fixed blade for cutting a label from label material fed through the label applicator. The fixed blade may be located on a cutting assembly via registration pins. The label applicator may include a paddle for applying the label to an object. The applicator may be incorporated into a mail processing system and controlled by various controllers.

17 Claims, 13 Drawing Sheets

LINERLESS LABEL APPLICATION ASSEMBLY

RELATED APPLICATION

This application claims the benefit of U.S. Provisional Application No. 60/461,992 filed Apr. 11, 2003 entitled "LINERLESS LABEL APPLICATION ASSEMBLY," the disclosure of which also is entirely incorporated herein by reference.

TECHNICAL FIELD

The present subject matter relates generally to a linerless label application assembly and a method of applying linerless labels to objects. More specifically, the subject matter relates to mail processing systems having a high speed, linerless label applicator for applying adhesive labels to objects such as newspapers, letters, or flat mailpieces.

BACKGROUND

Machines or devices are generally known to cut a label from a continuous roll of label material and to apply the cut label to an object. There are known devices that apply labels from lined label material and other known devices that apply labels utilizing linerless label material. Examples of both types of machines or devices are disclosed in U.S. Pat. Nos. 5,503,702, 5,922,169 and 5,783,032, each of which is expressly incorporated herein by reference in its entirety.

Known devices that are designed for use with labels that are carried on a substrate, liner or other backing material. These lined labels have a removable adhesive applied to one side of the label. Lined labels must be "converted" before the labels may be used in the known devices. Converting includes combining the label material with a liner material, die cutting the labels from the blank label material and removing the excess label material from the liner material.

The "converting" steps may be eliminated by using linerless labels, i.e., labels that are not carried on a substrate. Eliminating the conversion steps reduces the cost of the labels by reducing the number of production steps involved in creating the labels, as well as reducing the waste material created by the labels through the elimination of the die cut waste and unnecessary liner material.

Known devices that apply linerless labels to objects are relatively slow and therefore the applications with which such machines, and therefore linerless labels, can be used are limited. For example, the maximum cycle rate of known devices that apply linerless labels to objects is limited by the vacuum paddle actuation and return time. Successive cycles can not begin until the previous cycle is completed and the paddle returns to the rest position. A need exists, therefore, for a device that can apply linerless labels to objects at high speeds. For example, a need exists for a device that can apply permanent and repositionable adhesive labels onto letters and flat mailpieces. Additionally, there is a need to apply such labels to other objects, such as parcels, packages and newspapers.

SUMMARY

The present subject matter provides a linerless label application assembly. The assembly can create linerless labels from a continuous roll of material and apply the label to an object at high speeds. The assembly includes a label applicator with a cutting assembly having a moving blade and a fixed blade. The assembly can be incorporated into a mail processing system to provide high-speed, custom printed and sized labels that can be applied to various objects, such as mail pieces.

The present subject matter also provides a mail piece processing system including a label applicator for cutting a label from linerless label material and a controller. The label applicator includes a cutter assembly having a blade carrier, at least one registration pin on the blade carrier, a fixed blade mounted on the carrier via the registration pin, and a movable blade mounted to the blade carrier. The movable blade moves relative to the fixed blade to cut a label. The controller is coupled to the label applicator and controls operation of the movable blade to cut a label.

Additional advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
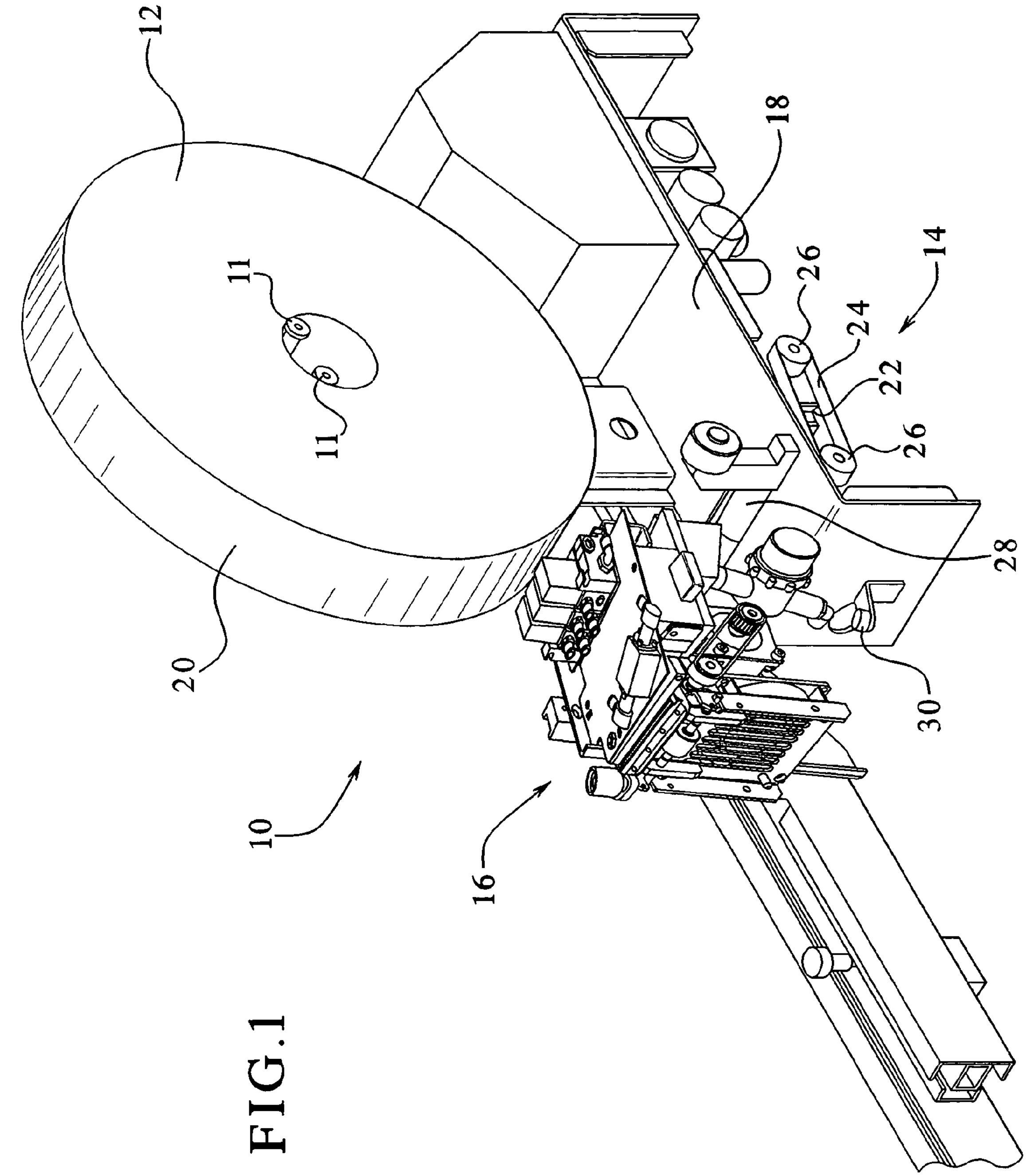
FIG. 1 is a perspective view of a linerless label application assembly according to the present teachings.
Figure 2:
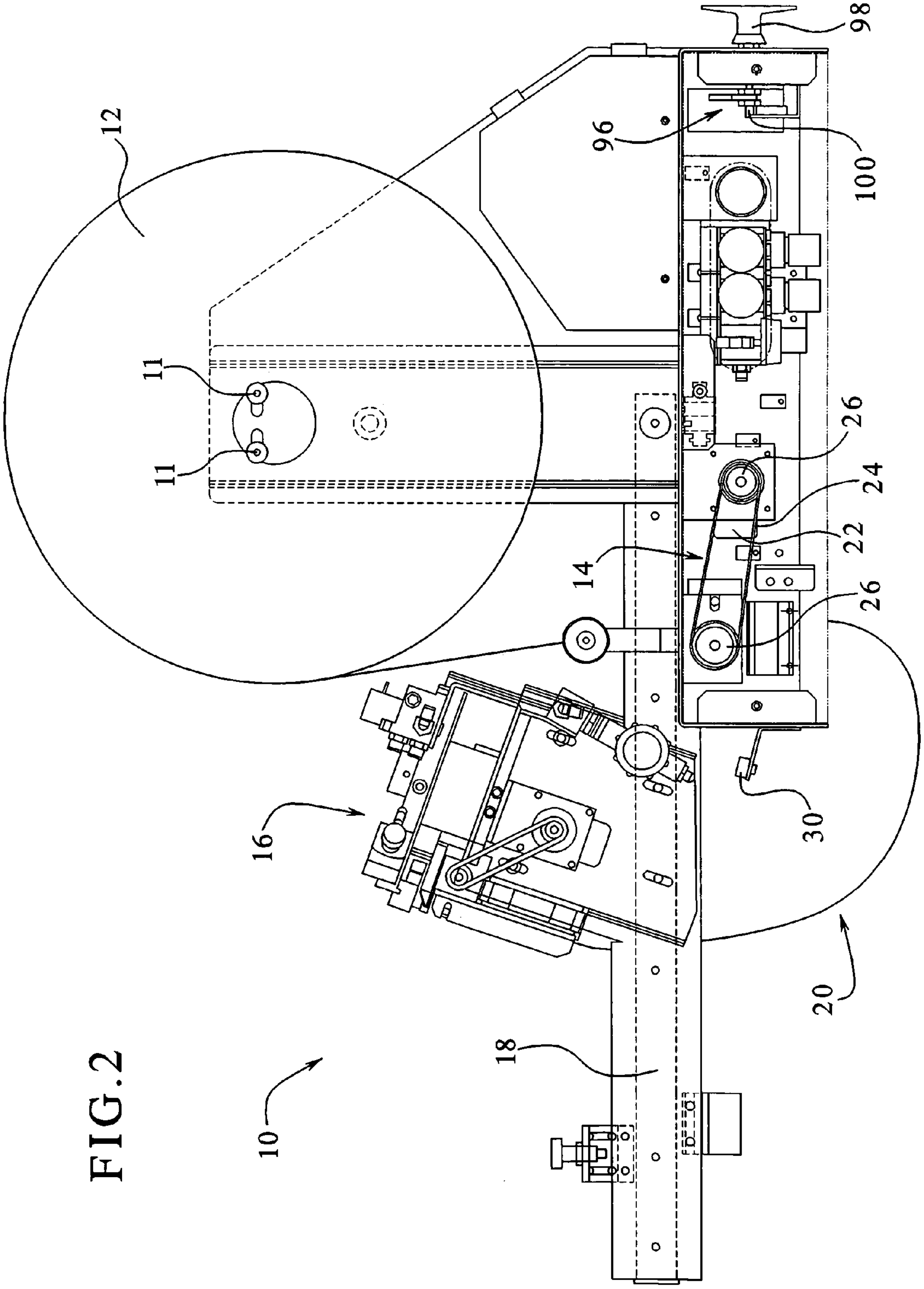
FIG. 2 is a side view of the linerless label application assembly of FIG. 1.

As shown in FIGS. 1 and 2, a label application assembly 10 has two pins 11 for holding a label roll 12. The label application assembly 10 further includes an unwind assembly 14 and a label applicator 16. The label application assembly 10 may be mounted on a frame 18 and may be used in a system for sorting and/or labeling objects, such as, for example, a system for addressing or sorting mail. The label application assembly 10 generally feeds linerless label material 20 from the label roll 12 to the label applicator 16, wherein a predetermined length of label material 20 is cut and applied to an object, such as, for example, an envelope or newspaper.

The label application assembly 10 may include a standard label roll 12 of label material 20 for forming adhesive labels. The standard label roll 12 may be up to 1,200 meters long and provide enough label material 20 to form approximately 100,000 ½-inch wide labels or about 16,000 3-inch wide labels. Examples of a standard label rolls 12 are manufactured or sold by Moore Label and Form under the trademark AdStix and by 3M Company under the trademark Post-it. Such label rolls 12 contain an acrylic adhesive on the back side of the label material 20. The label material 20 may include a repositionable seven day removable adhesive or permanent adhesive for adhering to various material, such as, for example, polywrap, tyvek and porus materials. The label material 20 may additionally be opaque and ultraviolet light blocking. Alternatively, it is contemplated that the label application assembly 10 may incorporate or utilize other non-standard size label rolls 12.

Figure 3:
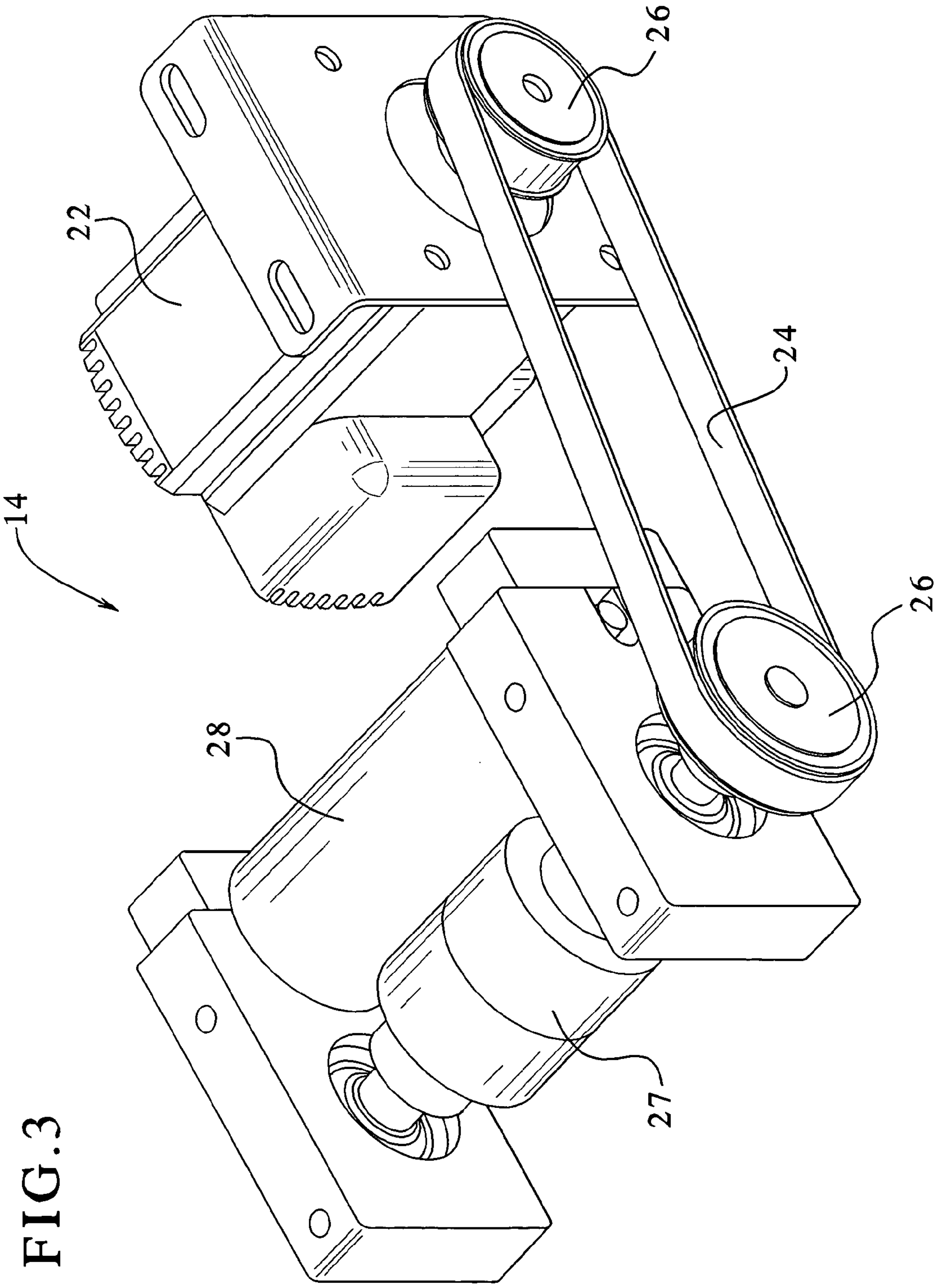
FIG. 3 is a perspective view of an unwind assembly according to the present teachings.

The unwind assembly 14 may be a conventional unwind assembly for unwinding the label material 20 from the label roll 12 such as ones disclosed in U.S. Pat. Nos. 5,503,702, 5,922,169 and 5,783,032, each of which is expressly incorporated herein in its entirety. In the embodiment shown in FIG. 3, an unwind motor 22 is provided to drive the unwind assembly 14 via a drive belt 24 and a first set of drive rolls 26. The operation of the unwind motor 22 may be controlled by a controller (not shown) to advance the label material 20 from the label roll 12 at a predetermined rate. The unwind assembly 14 unwinds the label material 20 from the label roll 12, feeds the label material 20 over an unwind roller 28, through the bottom of the frame 18 and to the label applicator 16. Preferably, the unwind assembly 14 unwinds a loop of label material 20 in excess of what is required to be fed directly to the label applicator 16. As a result, a loop of excess label material 20 may be gathered between the unwind assembly 14 and the label applicator 16. The loop of label material 20 allows the label applicator 16 to utilize label material 20 from the loop and not directly from the label roll 12, eliminating the problems associated with controlling the inertia of the moving label roll 12. A loop sensor 30 may be coupled to the controller to monitor the size of the loop of label material 20 and activate the motor 22 to unwind additional label material 20 when the loop becomes too small. The loop sensor 30 may be an infrared proximity sensor such as the sensor manufactured or sold by Banner Engineering, Corp. under the name T8 Diffuse-Mode Sensors.

Figure 10:
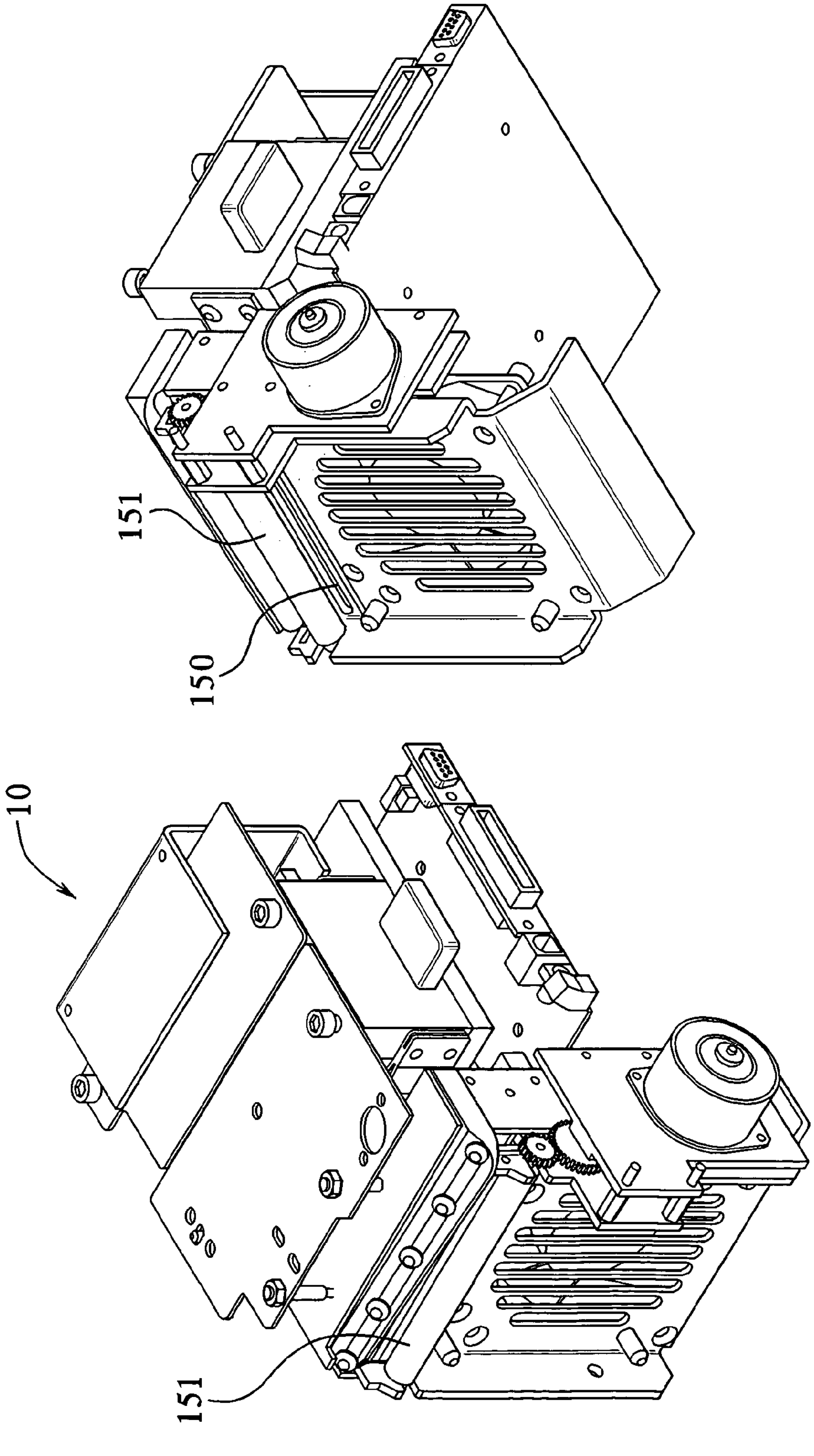
FIG. 10 is a perspective view of a cutter assembly with an integrated thermal printer.
Figure 11:
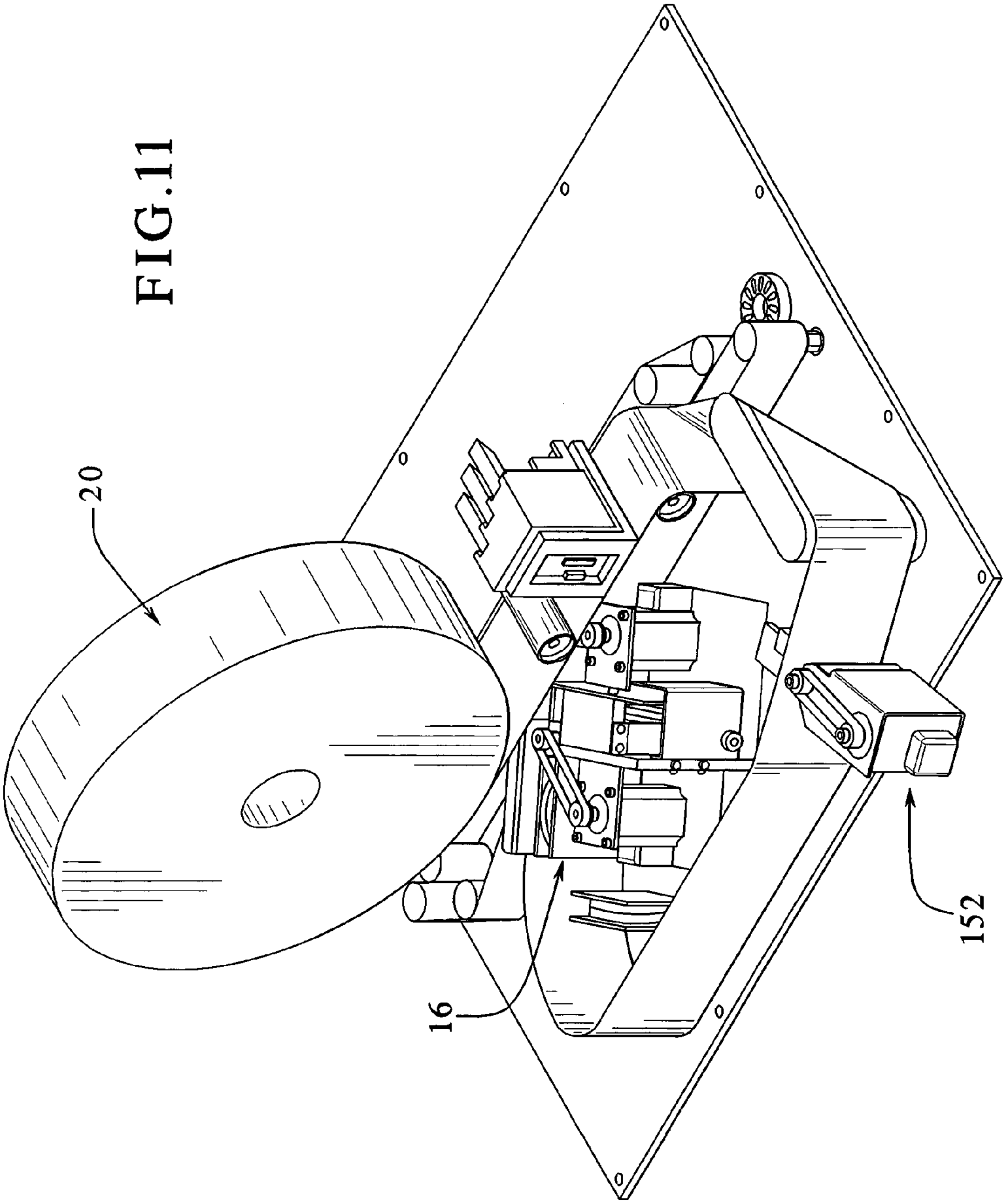
FIG. 11 is a perspective view of an alternate implementation of a cutter assembly with and integrated drop-on-demand printer.

The label application assembly 10 may include a printer for printing on the label material 20. The printer may be integrated with the label application assembly 10 (as shown in FIG. 10), using thermal printer 150 technology with a pressure roller 151 or drop-on-demand printer 152 technology (as shown in FIG. 11). Additional printing technologies maybe utilized such as ink transfer (not shown). The integrated drop on-demand printer uses the label application assembly 10 with a modified label transfer paddle 90 to affix the label to a intermediate belt 153 which may be a vacuum belt system. The intermediate belt 153 will transport the label in front of the drop on-demand printer 152 where the label will be printed. Following the printing operation, the label is transferred to the application belt 154 which will wipe the label on the item to be labeled. Flexibility in the use of various printer solutions is possible due to the configuration of the label application assembly 10 where the transfer speed of the label material 20 is much slower than the speed of the item being labeled.

Figure 12:
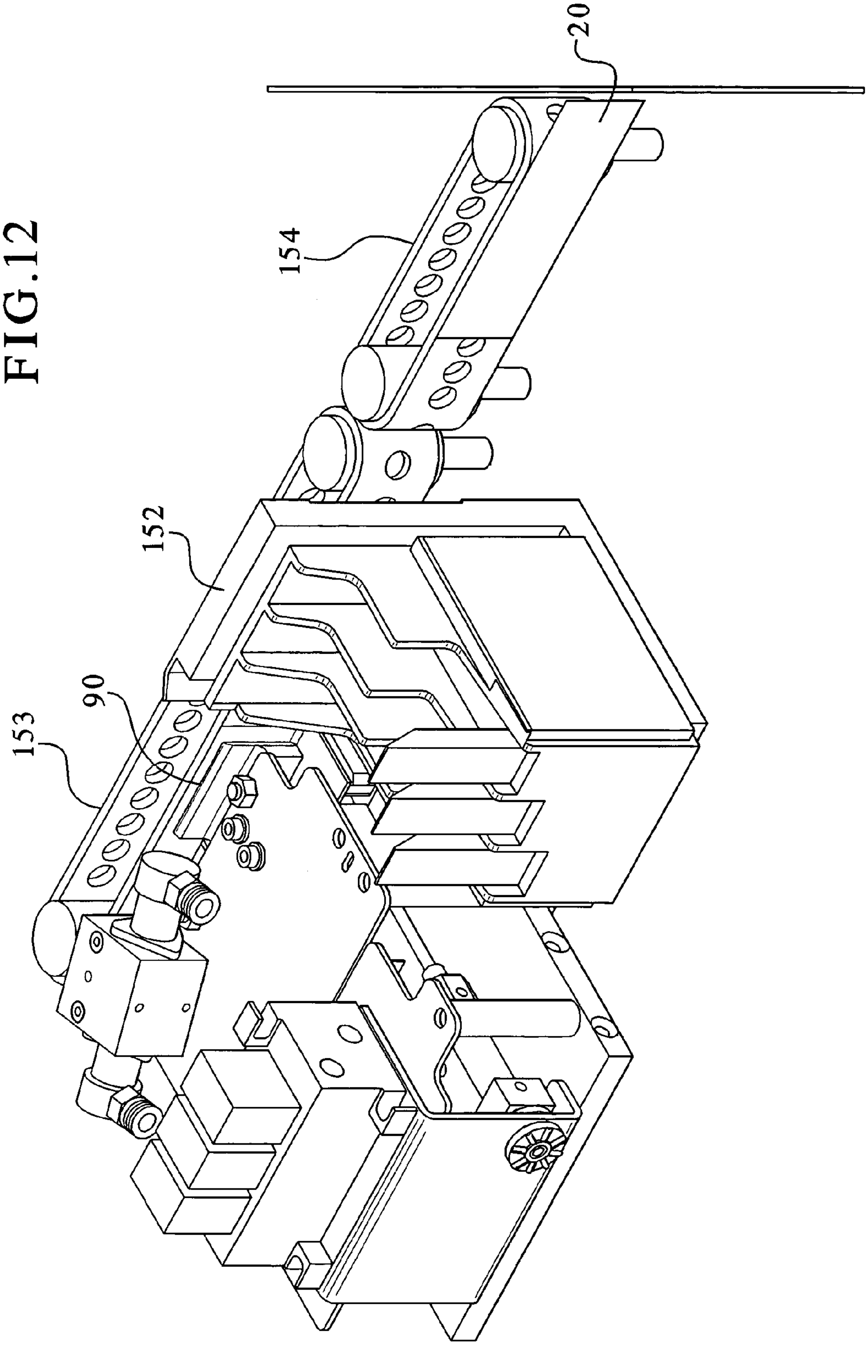
FIG. 12 is a perspective view of a label application assembly with a remote printer.

A remotely located printer may also be provided, as shown in FIG. 12. This configuration may be used when a significant amount of printing is required. In this configuration, synchronization tick marks can be printed on the label which can be identified by the control system 216 so that the control system 216 can ensure that the correct label will be placed on the desired item. The printer may be a high-speed, on-demand printer such as the one manufactured or sold by Hewlett Packard under the trademark HP45 Drop On-Demand printer. The printer may be configured to print onto the label material 20 at speeds fast enough to enable the printer to be located between the unwind assembly 14 and the label applicator 16 for printing onto the label material 20 as it is fed to the label applicator 16. Alternatively, pre-printed labels may be used, limiting or eliminating the use of the printer.

Figure 4:
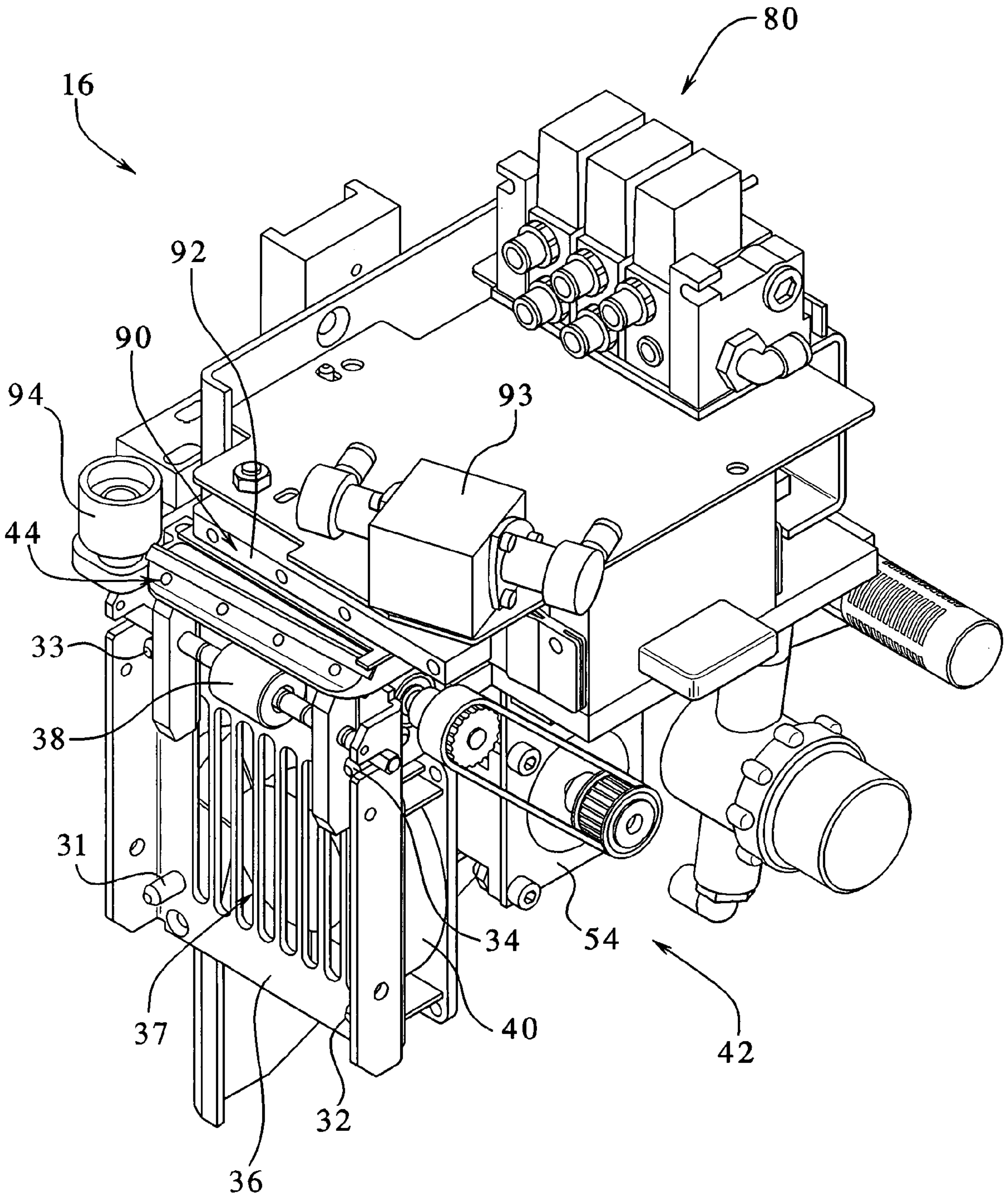
FIG. 4 is a perspective view of a cutter assembly of the label applicator according to the present teachings.
Figure 5:
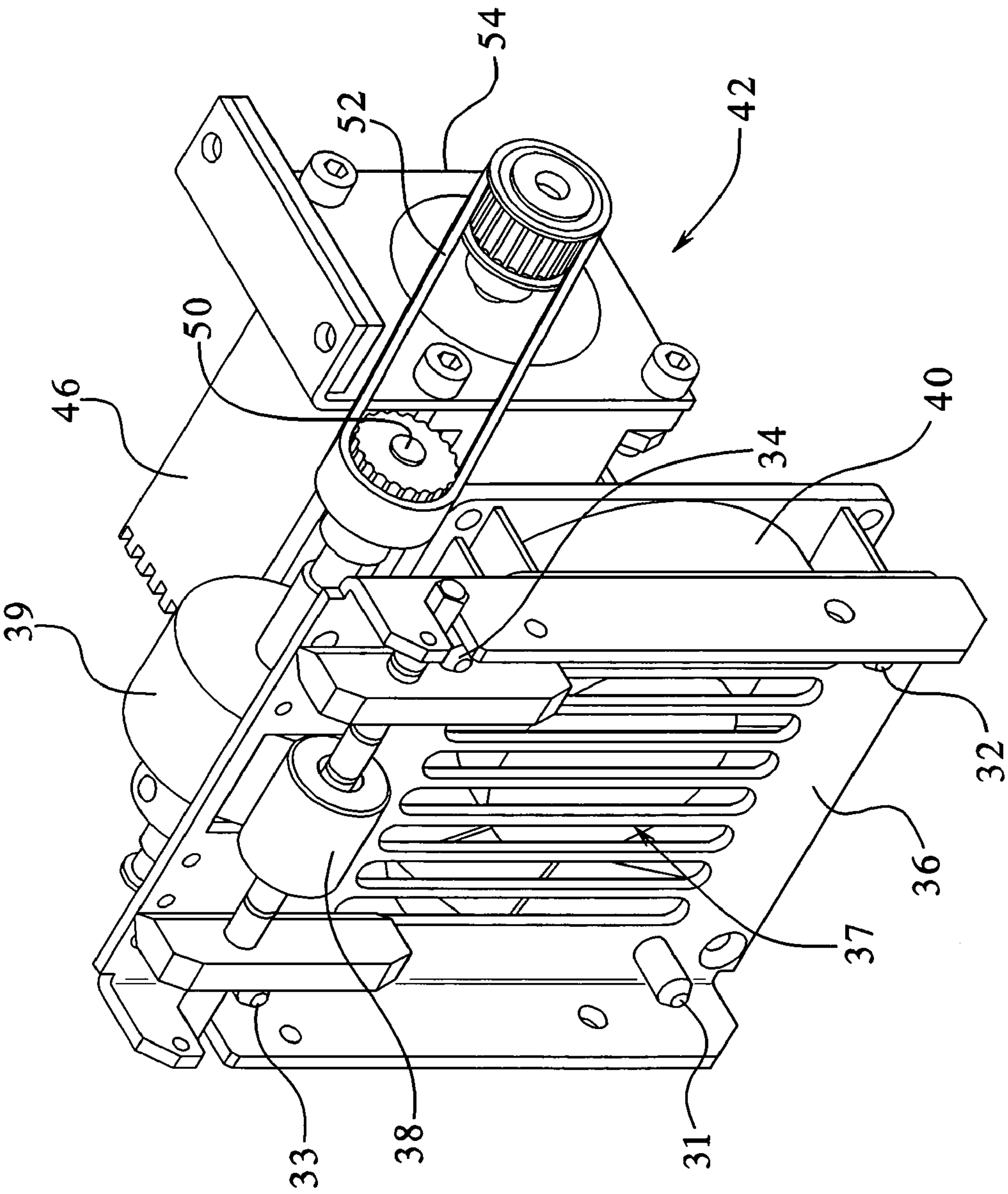
FIG. 5 is a perspective view of a feed motor assembly associated with the cutter assembly according to the present teachings.
Figure 6:
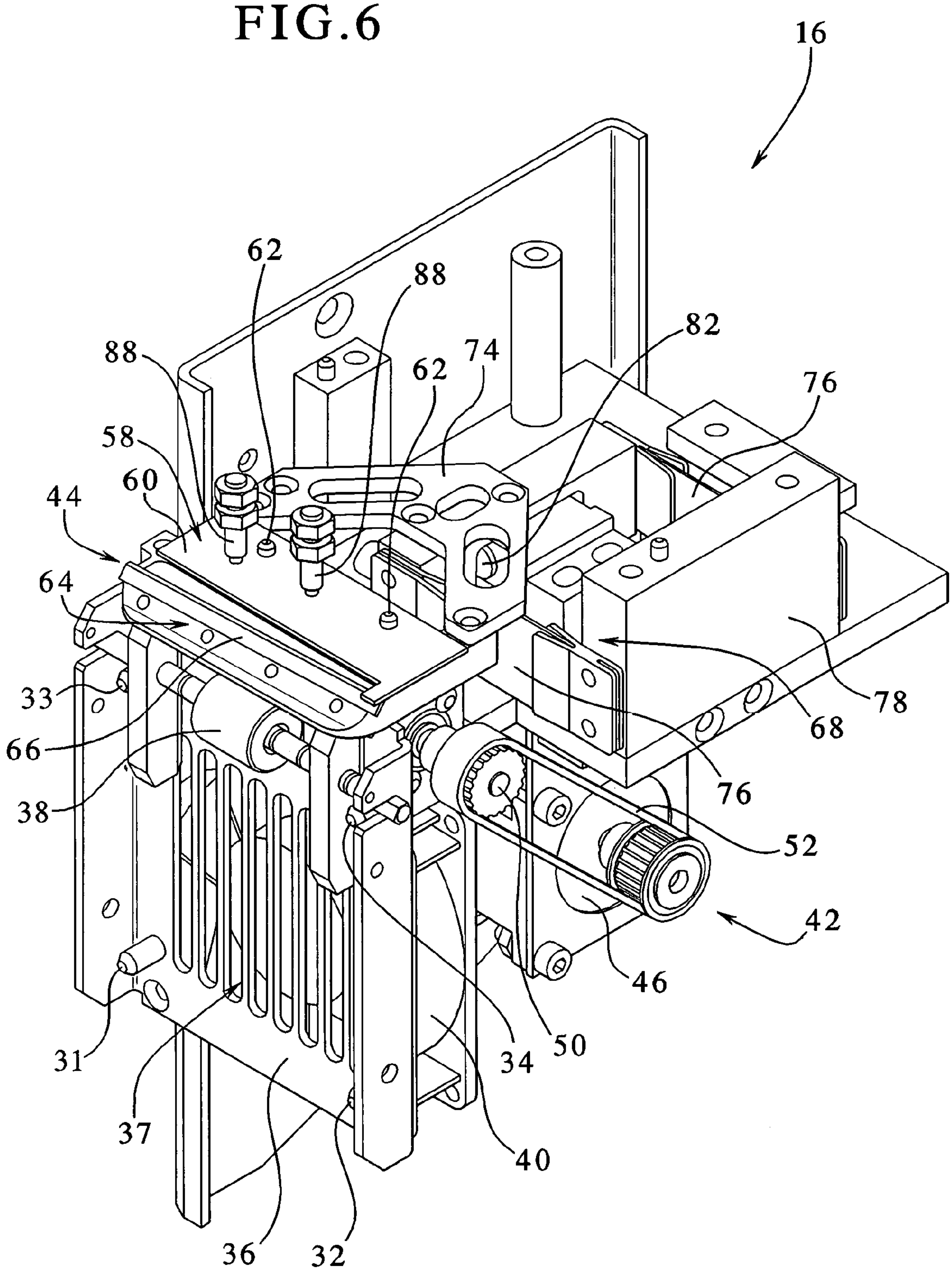
FIG. 6 is another perspective view of the cutter assembly of FIG. 4, with the pneumatic connector assembly removed.
Figure 7:
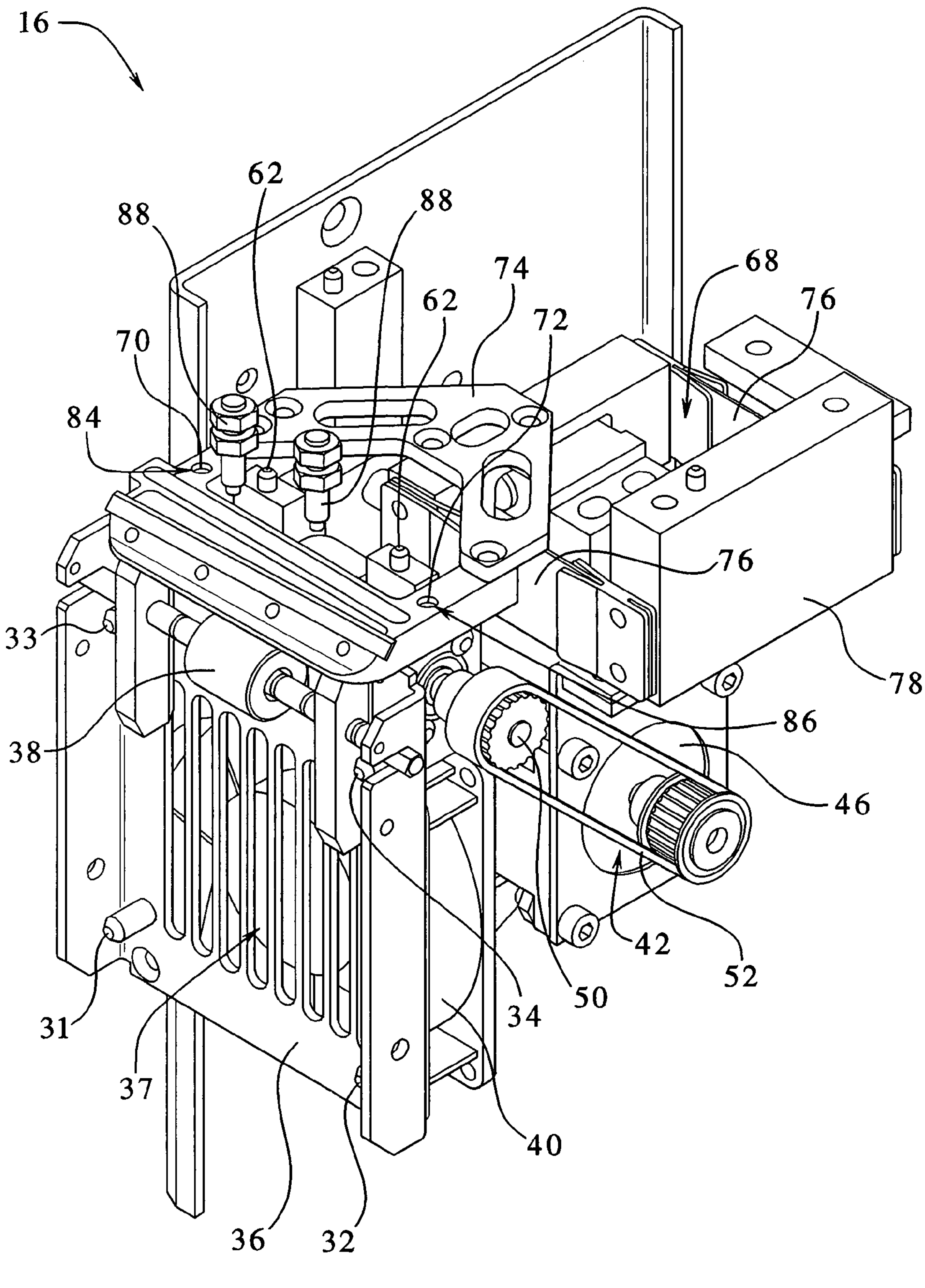
FIG. 7 is another perspective view of the cutter assembly of FIG. 6, with the fixed blade also removed.

As shown in FIG. 4, the label applicator 16 includes a pneumatic control assembly 80, a feed motor assembly 42 (see FIG. 5), and a cutter assembly 44 (see FIGS. 6–7). The cutter assembly 44 has a guide plate 36 with a set of registration pins 31, 32, 33 and 34 thereon. The cutter assembly 44 also includes a first feed roller 38 and a second feed roller 39. The first feed roller 38 and the second feed roller 39 are collectively referred to herein as the feed rollers 38 and 39. The registration pins 31, 32, 33 and 34 assist in the alignment of the label material 20 along the guide plate 36. As the label material 20 is fed to the label applicator 16 cutter assembly 44 from the label roll 12 by the unwind assembly 14 and feed motor assembly 42, the label material 20 is positioned between the guide pins 31, 32, 33 and 34 along the guide plate 36. The guide plate 36 shown in FIG. 4 is a vented guide plate 36 with vent holes 37 and a fan 40 is provided for creating a light vacuum along the vents 37 of the guide plate 36. The vacuum assists in positioning the label material 20 flat against the guide plate 36 as it is fed towards the feed rollers 38 and 39.

The first feed roller 38 of the feed motor assembly 42 is driven by a feed motor 46 to advance the label material 20 towards the cutter assembly 44. The label material 20 is advanced through the feed rollers 38 and 39 by the driven movement of the first feed roller 38. The feed rollers 38 and 39 may be coated or treated with a material to prevent the label material 20 from sticking to the feed roller 38. For example, the feed rollers 38 and 39 may be coated using the plasma coating process provided by Magneplate Company under the trademark Plazmadize 1401-04.

Figure 13:
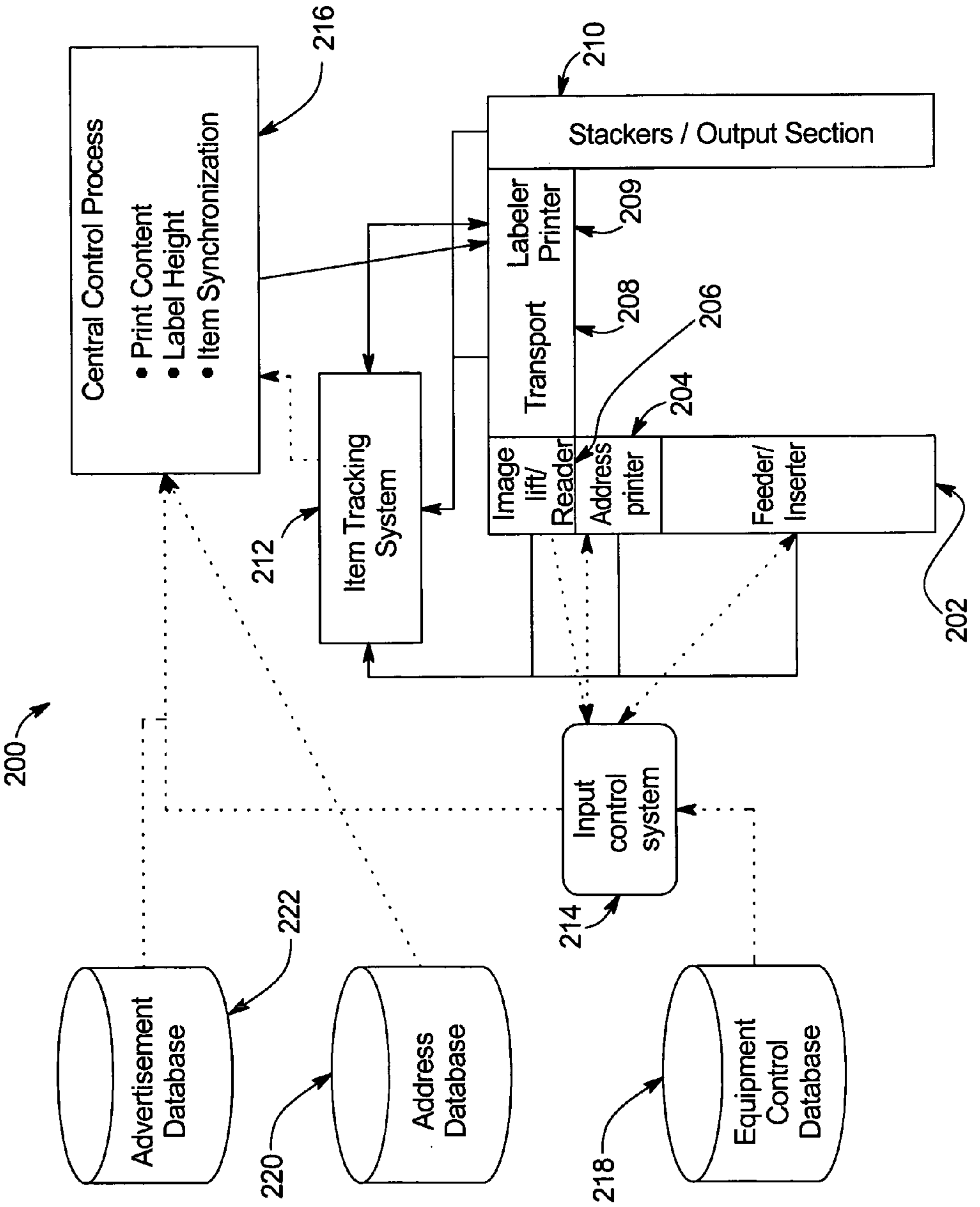
FIG. 13 is a schematic diagram of a system incorporating the label application assembly.

FIG. 5 illustrates an embodiment of the feed motor assembly 42 for use with the label applicator 16. The feed motor assembly 42 shown in FIG. 5 includes a feed motor 46, a feed roller axle 50 and a feed motor drive belt 52. The feed motor 46 shown in FIG. 5 is a stepper motor and is controlled by a controller, which is an integral part of the feed motor 46. The controller controls the speed and acceleration of the feed motor 46, as well as the number of steps taken by the feed motor 46. The controller may be a central control processor (as described below with reference to FIG. 13) and may send signals to the assembly 10 such that the number of steps taken by the feed motor varies as needed between each consecutive label that is created to provide variable height labels. Alternatively, the controller may be preprogrammed and may be an integral part of the feed motor 46.

Figure 9:
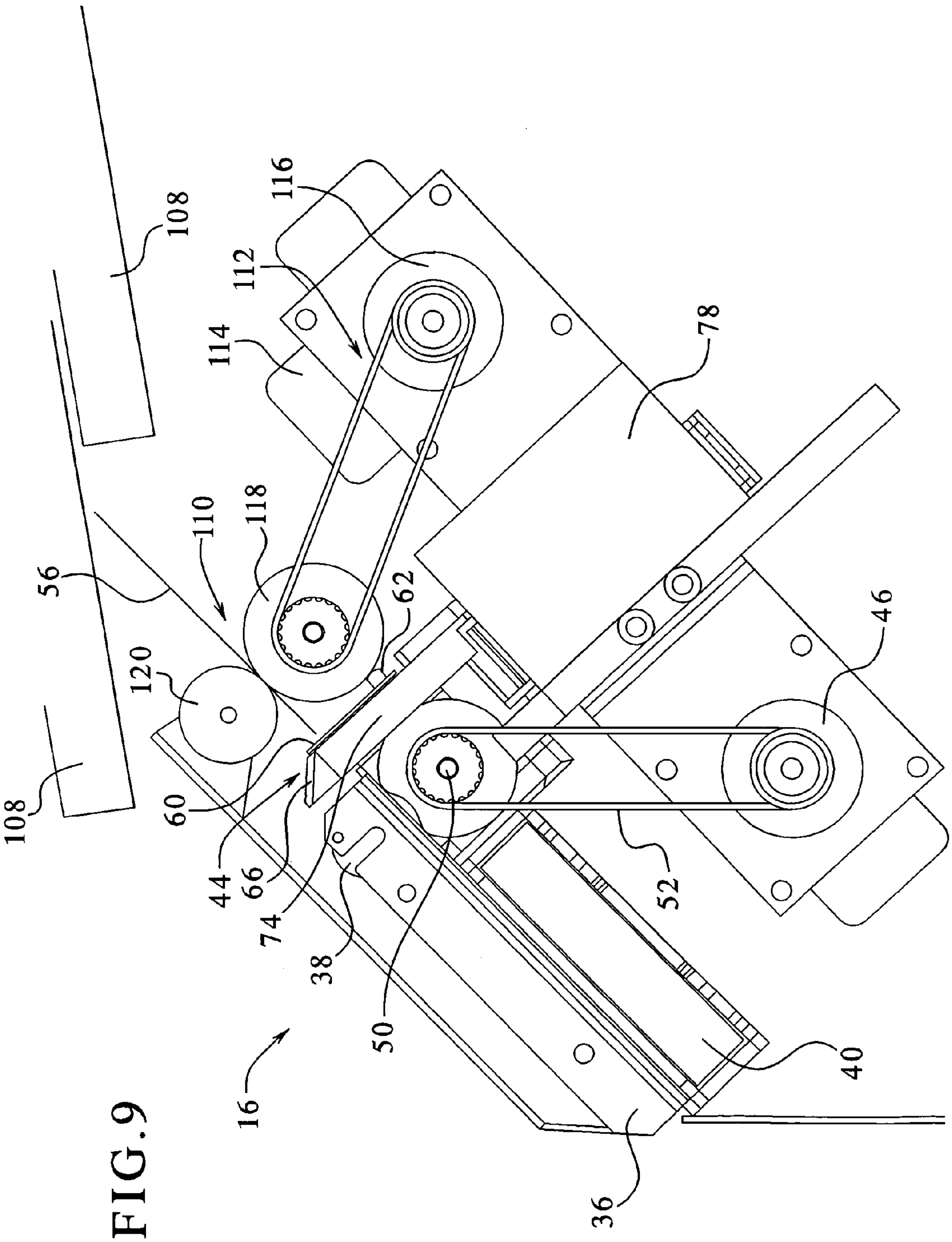
FIG. 9 is a side view of another cutter assembly according to the present teachings.

The feed rollers 38 and 39 advance the label material 20 to the cutter assembly 44 wherein a predetermined length of label material 20 is cut to provide a label 56 (see FIG. 9). The cutter assembly 44 will be described with reference to FIGS. 6 and 7. The cutter assembly 44 has a fixed blade assembly 58, including a fixed blade 60 and fixed blade registration pins 62 for attaching the fixed blade to the cutter assembly 44; a moving blade assembly 64, including a moving blade 66 and a spring assembly 68; and a first registration ball 70 and a second registration ball 72 at the interface between the fixed blade assembly 58 and the moving blade assembly 64. The first registration ball 70 and the second registration ball 72 are collectively referred to herein as the registration balls 70 and 72.

As shown in FIG. 6, the moving blade 66 is attached to a moving blade carrier 74. As shown, the moving blade carrier 74 interacts with the spring assembly 68 to control the movement of the moving blade 66 with respect to the fixed blade 60. Alternatively, movement of the moving blade carrier 74 may be controlled by a voice coil which may allow faster cycle times.

The moving blade 66 may be mounted to the moving blade carrier 74 such that the edge of the moving blade 66 is angled upwards towards the fixed blade 60 to facilitate the moving blade 66 passing beneath the fixed blade 60 to cut the label material 20 as described further below. Further, one end of the cutting edge of the moving blade 66 may be positioned slightly closer to the fixed blade 60 than the opposite end of the cutting edge of the moving blade 66 as shown, for example, in FIG. 6. Such skewed alignments of the moving blade 66 may be used to facilitate cutting the label material 20, as described further below. Further, the moving blade 66 may be moved using pneumatic vacuum control means 80 or may be electrically controlled.

The spring assembly 68 shown in FIG. 6 includes springs 76 mounted to a spring housing 78. The positioning of the springs 76 may be controlled via pneumatic controls 80, which may be mounted to the label applicator 16 as shown in FIG. 4. The springs 76 are coupled to the moving blade carrier 74 and are used to bias the moving blade carrier 74 towards and away from the fixed blade assembly 58. The moving blade carrier 74 may be biased away from the fixed blade assembly 58 to allow label material 20 to be fed between the fixed blade 60 and the moving blade 66. Further, the springs 76 may bias the moving blade carrier 74 towards the fixed blade assembly 58 to cause the fixed blade 60 and the moving blade 66 to cut the label material 20 to form a label 56. As further shown in FIG. 6, a stop 82 is provided to limit the motion of the moving blade carrier 74.

As shown in FIG. 7, the moving blade carrier 74 includes a first socket 84 and a second socket 86 for receiving the registration balls 70 and 72. The first socket 84 and the second socket 86 are collectively referred to herein as the sockets 84 and 86. As shown with reference to FIGS. 6 and 7, the fixed blade 60 mounts to the cutter assembly 44 via the fixed blade registration pins 62. For example, as shown in FIG. 6, a pair of spring plungers 88 may be used to secure the fixed blade 60 to the registration pins and provide a controlled downward force on the fixed blade 60. In the fixed position, the bottom surface of the fixed blade 60 rests upon the registration balls 70 and 72. As a result, the first and second sockets 84 and 86 and the registration balls 70 and 72 may be configured to position the fixed blade 60 at an angle with respect to the moving blade 66. Further, because the registration pins 62 are mounted directly to the cutter assembly 44, the fixed blade 60 may be positioned in a fixed position relative to the label material 20 that is fed through the label applicator 16.

For example, when using identically sized registration balls 70 and 72, the first socket 84 may be configured to position the first registration ball 70 deeper within the moving blade carrier 74 than the second registration ball 72, thereby positioning the first registration ball 70 lower than the second registration ball 72 and enabling the fixed blade 60 to be mounted to the fixed blade assembly 58 at an angle relative to the moving blade 66. Additionally, the fixed blade 60 may be positioned with its cutting edge tilted slightly downward towards the edge of the moving blade 66. Tilting the fixed blade 60 may further facilitate cutting the label material 20 to form a label 56, as described further below. Alternatively, the size and/or configuration of the registration balls 70 and 72 and the sockets 84 and 86 may be varied to otherwise position the fixed blade 60 with respect to the moving blade carrier 74.

The cutter assembly 44 is used to cut the label 56 from the continuous feed of label material 20. When activated to cut the label 56, the moving blade assembly 64 moves towards the fixed blade assembly 58 to create a scissors-like effect along the edge of the fixed blade 60 and the moving blade 66 to cut the label material 20 and form the label 56. The fixed blade 60 and the moving blade 66 may be positioned at skewed angles with respect to each other, as described further above, to facilitate cutting the label 56. The movement of the moving blade assembly 64 may be controlled by one or more controllers (such as ones described below with respect to FIG. 13) that activates the pneumatic controls 80 to operate the spring assembly 68 or voice coil coupled to the moving blade assembly 64.

The controller may be preprogrammed to activate the moving blade assembly 64 based on a timing mechanism, such as, for example, based on the movement of the feed motor assembly 42. Alternatively, a detector (not shown) may be provided for sensing a pre-printed registration-type mark on the label material 20 and sending a signal to the controller to activate the moving blade assembly 64. Further, the label applicator 16 is capable of creating labels 56 of different sizes on demand by varying the length of label material 20 fed through the cutter assembly 44 before activating the moving blade assembly 64. The controller processor selects the length of the label to match the size required to hold the printed material. The data printed on the label may include, without limitation, endorsement data, key line data, addressee, firm name, address, PLANET code, address block POSTNET barcode, mail piece identification mark or code and a customer message. The size of the label may vary and may be determined at least in part by the number of items or lines required for printing, the font size and print format.

After the label 56 is cut from the continuous roll of label material 20, the label 56 is temporarily positioned directly above the fixed blade 60 and the moving blade 66. Referring now to FIG. 4, a paddle assembly 90 is provided to apply the label 56 to an object, such as, for example, an envelope. The paddle assembly 90 shown in FIG. 4 includes a paddle 92 and an actuator 93, which may be pneumatically or electronically activated. The actuator 93 shown in FIG. 4 is a rotary air cylinder. However, the actuator 93 may be an alternative design, such as, for example, a rotary solenoid, a stepper motor, or a servo. The operation of the paddle assembly 90 may be controlled by a controller (as described below with reference to FIG. 13), similar to the controller described above with respect to the moving blade assembly 64. The label applicator 16 shown in FIG. 4 can apply at least ten, three-inch wide labels 56 per second.

In one contemplated embodiment, envelopes are brought to the label applicator 16 along a belt and conveyor system (shown schematically in FIG. 12.) such as mail sorting machine. The envelopes move along the conveyor system such that each envelope arrives at the label applicator 16 and is positioned adjacent to the label 56 as the cutter assembly 44 severs the label 56 from the label material 20. The label 56 is thereby positioned between the envelope and the paddle assembly 90. The controller then activates the paddle assembly 90 causing the paddle 92 to extend toward the envelope to place the label 56 on the envelope. The relative positions of the label applicator 16 and the conveyor system, as well as the timing of the actuator 93, may be adjusted to control the position the label 56 is applied to the envelope. Similarly, if the assembly 10 has an integrated printer or print head (see FIGS. 10, 11, and 12)), print functions can also be controlled and performed prior to the label being severed.

The paddle 92 shown in FIG. 4 is constructed from a light material, such as aluminum. The paddle assembly 90 may also include vacuum chambers (not shown) connected to vacuum holes on the face of the paddle 92 to hold the non-adhesive side of the label 56 as it is applied to the envelope. The size of the paddle 92 may correspond to the size of the label 56 to be applied. For example, it is contemplated that in an embodiment of the paddle assembly 90, the paddle 92 may be approximately one-half of an inch high and five inches long in order to apply labels 56 that are approximately one-half of an inch high by three inches long.

As further shown in FIG. 4, an object roller 94 is provided to secure the label 56 to the envelope, or other object, by applying pressure to the label 56 as the conveyor system removes the envelope, or other object, from above the label applicator 16. The object roller 94 may be a driven roller or an undriven roller. The object roller 94 may be coated or treated with a material to prevent the object from sticking to the object roller 94. For example, the object roller 94 may be coated using the plasma coating process provided by Magneplate Company under the trademark Plazmadize 1401-04. Further, the object roller 94 may be positioned to direct the object away from the paddle assembly 90, assisting the separation of the object and the paddle 94 after the label 56 has been applied.

Figure 8:
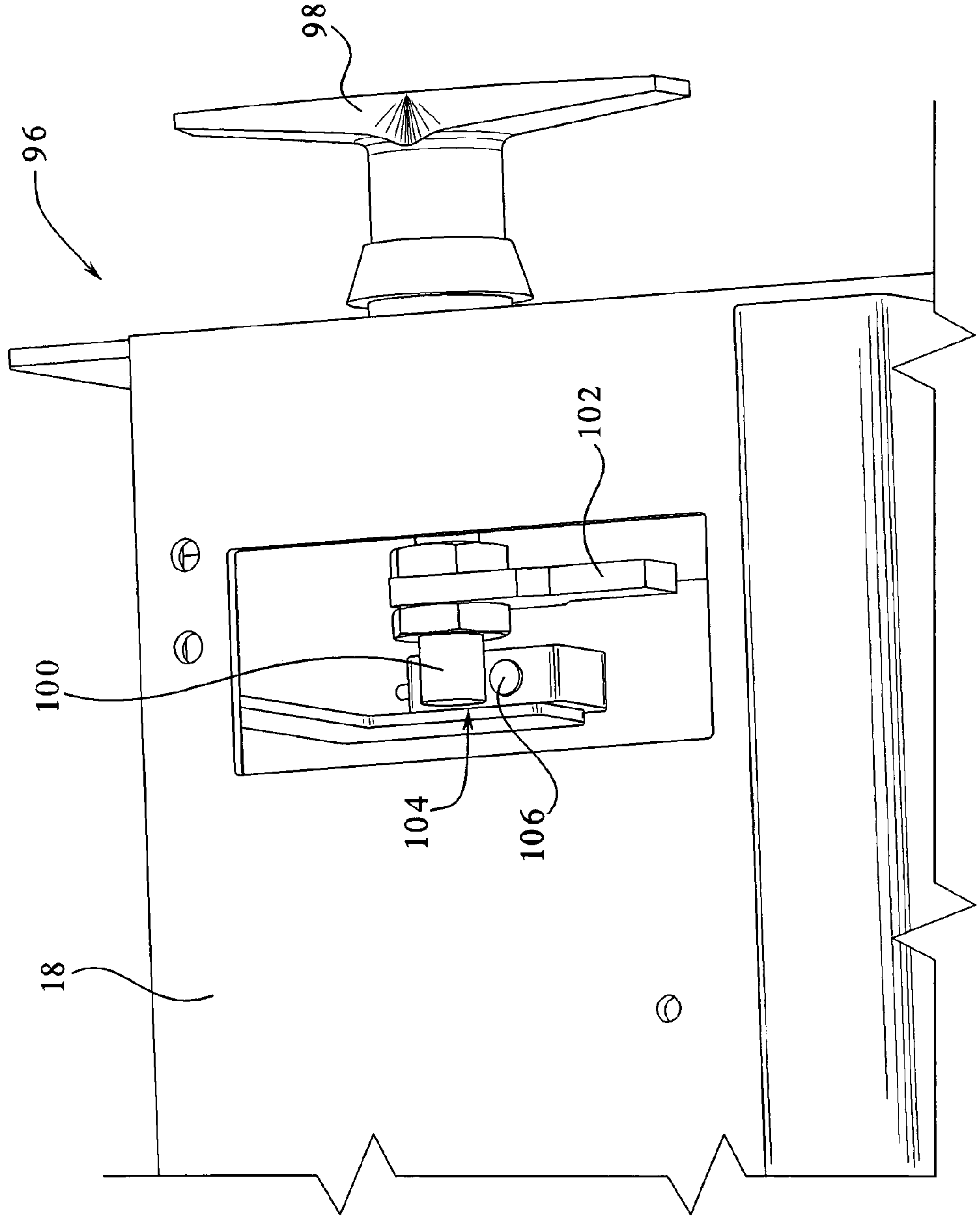
FIG. 8 is a top view of a locking mechanism according to the present teachings.

As shown in FIG. 1, the label application assembly 10 is provided on a frame 18. The label application assembly 10 may be a modular assembly and may be disposed on a sliding roller assembly to facilitate easy repositioning and/or removal from the frame 18. Accordingly, the label application assembly 10 may be an integrated, field replaceable label application assembly 10. The sliding roller assembly provides easier access to the label application assembly 10 for servicing and regular maintenance. For example, in a typical installation, the label roll 12 may be changed or renewed daily. A locking assembly 96 may be provided to ensure proper placement of the label application assembly 10 on the frame 18 and to further secure the label application assembly 10 to the frame 18, as shown in FIG. 2. The locking assembly 96 may include a handle 98, a locking axle 100, a hook 102 and a locking sensor 104, as shown in FIG. 8. The locking sensor 104 may include a transmitter 106 and a receiver (not shown), wherein a signal is provided by the transmitter 106 to be received by the receiver. The signal may be, for example, an infrared or other optical signal. The locking sensor 104 may be used to control the operation of the label application assembly 10. For example, when the signal transmitted by the transmitter 106 is not received by the receiver, the operation of the label application assembly 10 may be disabled.

For example, in a contemplated embodiment, when the label application assembly 10 is first positioned on the frame 18, the locking axle 100 may be positioned to prevent the signal from being received by the receiver, thereby disabling the label application assembly 10. However, when the handle 98 is rotated to a locked position, the hook 102 rotates and grasps the frame 18 and the locking axle 100 may be repositioned to allow the signal to be received by the receiver. Consequently, the label application assembly 10 will not operate unless the locking assembly 96 properly engages the frame 18.

In the embodiment depicted in FIG. 8, the locking sensor 104 is a self-contained, retroreflective mode sensor that transmits a signal. The signal is received by the locking sensor 104 only when the locking sensor 104 is properly aligned with a retroreflective target (not shown). The retroreflective target may mounted to the frame 18 in a position that requires the locking assembly 96 to be properly engaged to align the locking sensor 104 and the retroreflective target. Accordingly, the label application assembly 10 must be properly positioned on the frame 18 and the locking assembly 96 must be engaged to expose the retroreflective target to activate the locking sensor 104 and enable the operation of the label application assembly 10.

An alternative embodiment of the label applicator 16 is depicted in FIG. 9. As shown in FIG. 9, newspapers 108 or other objects are carried above the label applicator 16 along a conveyor system. Labels 56 may be formed from label material 20 as described above with respect to FIGS. 1–8; however, in the embodiment shown in FIG. 9, the label applicator 16 does not include the paddle assembly 90.

As shown in FIG. 9, an application roller assembly 110 is provided to apply the labels 56 to the newspapers 108. The application roller assembly includes an application drive assembly 112 including a motor 114, a drive roller 116, a driven application roller 118 and an undriven application roller 120. The driven application roller 118 and the undriven application roller 120 may be coated or treated with a material to prevent the object from sticking to the driven application roller 118 and the undriven application roller 120. For example, the driven application roller 118 (which contacts the non-adhesive side of the label 56) may be formed from silicone rubber and the undriven application roller 120 (which contacts the adhesive side of the label 56) may be coated using the plasma coating process provided by Magneplate Company under the trademark Plazmadize 1401-04. The operation of the application drive assembly 112 may be controlled by a controller (not shown) and the controller may be separate from, or part of, the controllers discussed above.

As further shown in FIG. 9, the label material 20 is fed through the cutter assembly 44, the label 56 is severed from the label material 20, and the application roller assembly 110 applies the label 56 to the newspapers 108. The label 56 is grasped between the driven application roller 118 and the undriven application roller 120 as it is severed from the continuous label material 20. The driven application roller 118 and the undriven application roller 120 then pull the label 56 away from the label applicator 16 and apply the label 56 to the newspaper 108. By eliminating the time delay associated with the operation of the paddle assembly 90, the label applicator 16 shown in FIG. 9 may process in excess of 40,000 labels per hour.

Referring now to FIG. 12, a system 200 in which the label application assembly may be incorporated is shown schematically. The system 200 may be a mail sorter system, a mail inserter system, a bindery line or other special purpose system having a transport path through which mail pieces can travel. As shown the system includes various mail processing equipment pieces, including a mail piece feeder or inserter 202, an address printer 204, an image lift or reader 206, a transport 208, a label application assembly 209 and a stacker or output section 210. Other processing equipment pieces may also be added to the system 200, e.g., a printer, etc. The system 200 and each of the individual processing equipment pieces 202, 204, 206, 208, 209 and 210, or components on the pieces, may be controlled by various controllers or control systems. For example, as shown, the system 200 includes an item tracking system 212, an input control system 214 and a central control processor 216.

As shown, the input control system 214 is coupled to the mail piece feeder or inserter equipment 202, the address printer 204 and the image lift or reader 206. The input control system 214 may select data required for addressing or insertion content control from an equipment control database 218. The data is then used to control the address printer 204 and the feeder/inserter 202 or any other data driven function of any other piece of processing equipment in the system 200. For example, the processing equipment may use an image lift reader 206 to read the address and addressee on a mail piece or to read an identification mark such as a barcode on a mail piece. The address and addressee information can be transferred to the input control system 214 and then forwarded to the central control processor 216 for labeler application assembly 209 control, e.g. control of the label application assembly printer. If an identification mark is read, the input control system 214 can query the equipment control database 218 to extract address and addressee data and forward the data to the central control processor 216. In another example, an identification mark may be read and sent to the central control processor 216 which could then query an address database 220 to obtain address information for a mail piece.

As shown, the central control processor 216 is coupled to the label application assembly 209 to control printer and label application functions. As discussed above, the printer can be integrated into the label assembly 209 and/or remotely mounted. The printing functions can be controlled by the central control processor 216 so that the printing is performed on-demand. Label application and printer timing are controlled by the control processor 216 to ensure synchronization between a given mail piece and creation of a specific label for the given mail piece.

Printer control functions may include utilizing address data from the address database 220 to determine the full contents to be printed on the label. The content to be printed may include, but is not limited to addressee, address, PlanetCode, POSTNET barcode, USPS endorsement and key line data, a custom message to an addressee and advertisements. Labels can be blank or may contain pre-printed data that will have additional content printed thereon for customization. An advertisement database 222 and the address database 220 may contain data for control of the label assembly 209 or remote printer. Based on the contents to be printed, the central control processor 216 can determine the required label size and the print contents which can be sent to the label application assembly 209 and/or the remote printer. Alternatively, the printer can print a mark on the label material 20, such as a control code, registration mark or tick mark, which can be used by the label applicator 209 to register the label and synchronize the label application, as described further below. Similarly, registration or other marks may be pre-provided on the label material 20. The label material 20 may be fed from the unwind assembly 14 to the label applicator 209, as described above with reference to FIGS. 4–7 and 9.

As also shown, the item tracking system 212 is coupled to each of the pieces of equipment, 202, 204, 206, 208, 209 and 210. Mail pieces or items can be tracked within the system 200 by the item tracking system 212 so that the exact location of the mail piece or item is precisely known at all times. In this manner, the item tracking system 212 uniquely identifies a mail piece by the addressee and its position in the transport path. Tracking data generated by the item tracking system 212 is used by the central control processor 216 to synchronize the operation of printing onto a label or specific item (mail piece) associated with a specific addressee onto an item. The central control processor 216, in conjunction with the item tracking system 212, will maintain item tracking through starts, stops and jams in the equipment. Resynchronization steps will be communicated to the equipment operation, if required, through existing equipment operator interface. Commands may include removal of already printed labels from the labeler or the removal of items from the equipment for which positive tracking has been lost.

Many of the control functions discussed above relating to the system 200 are implemented on controllers or computers, which of course may be connected for data communication via the components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The system 200 also may be coupled to a display and one or more user input devices (not shown) such as alphanumeric and other keys of a keyboard, a mouse, a trackball, etc. The display and user input element (s) together form a service-related user interface, for interactive control of the operation of the system 200. These user interface elements may be locally coupled to the system 200, for example in a workstation configuration, or the user interface elements may be remote from the computer and communicate therewith via a network. The elements of such a general-purpose computer also may be combined with or built into routing elements or nodes of the network, such as the IWF or the MSC.

The software functionalities involve programming, including executable code as well as associated stored data. The software code is executable by the general-purpose computer that functions as the particular computer for a control system, e.g. the central control processor 216, item tracking system 212, input control system 214 or any other controller. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the tracking, printing and other functions described above, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platforms. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It should be noted that various changes and modifications to the subject matter described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A cutter assembly for cutting a label from linerless label material comprising:

a fixed blade carrier;

a fixed blade, the fixed blade being mounted on the fixed blade carrier;

a movable blade carrier including a first and a second socket and a moveable blade mounted to the moveable blade carrier and wherein the movable blade moves relative to the fixed blade; and a first and a second registration ball seated in said first and second sockets, respectively, wherein said first and second registration balls are in contact with said fixed blade.

2. The cutter assembly of claim 1 further comprising a controller coupled to the movable blade for causing sliding movement of the moveable blade relative to the fixed blade.

3. The cutter assembly of claim 2 wherein the controller further comprises a detector for sensing an object and generating a signal to cause movement of the movable blade.

4. The cutter assembly of claim 1 further comprising a movable paddle mounted adjacent to the blades and having an actuator coupled to the paddle.

5. The cutter assembly of claim 4 wherein the paddle includes vacuum chambers to provide suction forces along a face of the paddle.

6. The cutter assembly of claim 1 further comprising a printer coupled to the blade carrier.

7. The cutter assembly of claim 6 wherein the printer is mounted to the blade carrier.

8. The cutter assembly of claim 6 wherein the printer is mounted remotely from the blade carrier.

9. The cutter assembly of claim 1 further including one or more spring plungers providing a controlled force on said fixed blade to maintain contact between said first and second registration balls and said fixed blade.

10. The cutter assembly of claim 1 wherein said fixed blade is mounted to said blade carrier via a registration pin mounted to said blade carrier.

11. A mail piece processing system comprising:

a label applicator for cutting a label from linerless label material, the label applicator comprising a cutter assembly comprising (a) a fixed blade carrier, (b) a fixed blade, the fixed blade being mounted on the fixed blade carrier, (c) a movable blade carrier including a first and a second socket and a moveable blade mounted to the moveable blade carrier and wherein the movable blade moves relative to the fixed blade, and (d) a first and a second registration ball seated in said first and second sockets, respectively, wherein said first and second registration balls are in contact with said fixed blade; and a controller coupled to the label applicator for controlling operation of the movable blade to cut a label.

12. The system of claim 11 further comprising a printer for printing on the label material coupled to the controller.

13. The system of claim 12 wherein the printer is mounted to the blade carrier.

14. The system of claim 12 wherein the controller sends signals to the printer representing data to be printed on the label material.

15. The system of claim 14 further comprising an image reader for reading images on mail pieces coupled to the controller.

16. The system of claim 15 wherein:

the image reader sends a signal to the controller regarding an image on a mail piece, and in response to the image signal, the controller sends a print signal to the printer representing data to be printed on label material for that mail piece.

17. A cutter assembly for cutting a label from linerless label material comprising:

a fixed blade assembly including a fixed blade;

a movable blade assembly including a first and a second socket and a moveable blade wherein the movable blade moves relative to the fixed blade; and a first and a second registration ball seated in said first and second sockets, respectively, wherein said first and second registration balls are in contact with said fixed blade assembly.

* * * * *